(12) United States Patent
Woodral

(10) Patent No.: US 7,281,077 B2
(45) Date of Patent: Oct. 9, 2007

(54) ELASTIC BUFFER MODULE FOR PCI EXPRESS DEVICES

(75) Inventor: David E. Woodral, Walnut, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 236 days.

(21) Appl. No.: 11/099,759

(22) Filed: Apr. 6, 2005

(65) Prior Publication Data

US 2006/0230215 A1    Oct. 12, 2006

(51) Int. Cl.
G06F 13/00    (2006.01)

(52) U.S. Cl. .................. 710/310; 710/52; 710/53; 710/57

(58) Field of Classification Search .......... 710/52, 710/53, 57, 310
See application file for complete search history.

(56) References Cited

U.S. PATENT DOCUMENTS

| | | | |
|---|---|---|---|
| 4,268,906 A | 5/1981 | Bourke et al. | |
| 4,333,143 A | 6/1982 | Calder | |
| 4,449,182 A | 5/1984 | Rubinson | |
| 4,549,263 A | 10/1985 | Calder | |
| 4,777,595 A | 10/1988 | Strecker et al. | |
| 4,783,730 A | 11/1988 | Fischer | |
| 4,783,739 A | 11/1988 | Calder | |
| 4,803,622 A | 2/1989 | Bain, Jr. et al. | |
| 5,129,064 A | 7/1992 | Fogg, Jr. et al. | |
| 5,212,795 A | 5/1993 | Hendry | |
| 5,249,279 A | 9/1993 | Schmenk et al. | |
| 5,276,807 A | 1/1994 | Kodama et al. | |
| 5,280,587 A | 1/1994 | Shimodaira et al. | |
| 5,321,816 A | 6/1994 | Rogan et al. | |
| 5,347,638 A | 9/1994 | Desai et al. | |

(Continued)

FOREIGN PATENT DOCUMENTS

EP    0738978    10/1996

(Continued)

OTHER PUBLICATIONS

Budruk, Ravi; Anderson, Don; and Shanley, Tom; PCI Express System Architecture; Mindshare Inc.; 2004; pp. 434,436-439,442-443.*

(Continued)

Primary Examiner—Glenn A. Auve
(74) Attorney, Agent, or Firm—Klein, O'Neill & Singh, LLP; TJ Singh

(57) ABSTRACT

A method and system for a PCI Express device is provided. The elastic buffer includes, a buffer control module that determines a difference between a write and read pointer value and compares the difference to a threshold value for inserting or deleting a standard symbol, wherein the threshold value is adjusted dynamically based on a slow or fast clock speed. The standard symbol is a PCI Express SKIP symbol. The method includes, determining if a clock speed is slow, wherein a monitoring register value indicates if a clock speed is slow; selecting a threshold value based on the monitoring register value; and inserting or deleting a standard symbol based on a comparison of a difference between a write and read pointer and the threshold value. The PCI Express device may be a host bus adapter operating in a storage area network or any other network.

18 Claims, 15 Drawing Sheets

U.S. PATENT DOCUMENTS

| | | | |
|---|---|---|---|
| 5,371,861 A | 12/1994 | Keener et al. | |
| 5,388,237 A | 2/1995 | Sodos | |
| 5,448,702 A | 9/1995 | Garcia, Jr. et al. | |
| 5,469,453 A | 11/1995 | Glider et al. | |
| 5,568,614 A | 10/1996 | Mendelson et al. | |
| 5,613,162 A | 3/1997 | Kabenjian et al. | |
| 5,632,016 A | 5/1997 | Hoch et al. | |
| 5,647,057 A | 7/1997 | Roden et al. | |
| 5,671,365 A | 9/1997 | Binford et al. | |
| 5,740,467 A | 4/1998 | Chmielecki, Jr. et al. | |
| 5,758,187 A | 5/1998 | Young | |
| 5,761,427 A | 6/1998 | Shah et al. | |
| 5,828,903 A | 10/1998 | Sethuram et al. | |
| 5,875,343 A | 2/1999 | Binford et al. | |
| 5,881,296 A | 3/1999 | Williams et al. | |
| 5,892,969 A | 4/1999 | Young | |
| 5,905,905 A | 5/1999 | Dailey et al. | |
| 5,917,723 A | 6/1999 | Binford | |
| 5,968,143 A | 10/1999 | Chisholm et al. | |
| 5,983,292 A | 11/1999 | Nordstrom et al. | |
| 6,006,340 A * | 12/1999 | O'Connell | 713/600 |
| 6,049,802 A | 4/2000 | Waggener, Jr. et al. | |
| 6,055,603 A | 4/2000 | Ofer et al. | |
| 6,078,970 A | 6/2000 | Nordstrom et al. | |
| 6,085,277 A | 7/2000 | Nordstrom et al. | |
| 6,115,761 A | 9/2000 | Daniel et al. | |
| 6,118,776 A | 9/2000 | Berman | |
| 6,138,176 A | 10/2000 | McDonald et al. | |
| 6,185,620 B1 | 2/2001 | Weber et al. | |
| 6,233,244 B1 | 5/2001 | Runaldue et al. | |
| 6,269,413 B1 | 7/2001 | Sherlock | |
| 6,397,277 B1 | 5/2002 | Kato et al. | |
| 6,408,349 B1 * | 6/2002 | Castellano | 710/56 |
| 6,434,630 B1 | 8/2002 | Micalizzi, Jr. et al. | |
| 6,457,090 B1 | 9/2002 | Young | |
| 6,463,032 B1 | 10/2002 | Lau et al. | |
| 6,502,189 B1 | 12/2002 | Westby | |
| 6,504,846 B1 | 1/2003 | Yu et al. | |
| 6,526,518 B1 | 2/2003 | Catlin et al. | |
| 6,546,010 B1 | 4/2003 | Merchant et al. | |
| 6,564,271 B2 | 5/2003 | Micalizzi, Jr. et al. | |
| 6,594,329 B1 * | 7/2003 | Susnow | 375/372 |
| 6,604,224 B1 | 8/2003 | Armstrong et al. | |
| 6,671,776 B1 | 12/2003 | DeKoning | |
| 6,671,832 B1 | 12/2003 | Apisdorf | |
| 6,721,799 B1 | 4/2004 | Slivkoff | |
| 6,725,388 B1 * | 4/2004 | Susnow | 713/400 |
| 6,810,440 B2 | 10/2004 | Micalizzi, Jr. et al. | |
| 6,810,442 B1 | 10/2004 | Lin et al. | |
| 2002/0069317 A1 | 6/2002 | Chow et al. | |
| 2003/0097481 A1 | 5/2003 | Richter | |
| 2003/0126320 A1 | 7/2003 | Liu et al. | |
| 2004/0073862 A1 | 4/2004 | Armstrong et al. | |
| 2005/0058148 A1 * | 3/2005 | Castellano et al. | 370/428 |
| 2005/0141661 A1 * | 6/2005 | Renaud et al. | 375/372 |
| 2006/0156083 A1 * | 7/2006 | Jang et al. | 714/700 |
| 2007/0124623 A1 * | 5/2007 | Tseng | 713/503 |

FOREIGN PATENT DOCUMENTS

| | | |
|---|---|---|
| EP | 1059588 | 12/2000 |
| WO | WO 95/06286 | 3/1995 |
| WO | WO 00/58843 | 10/2000 |

OTHER PUBLICATIONS

PCI Express Base Specification Revision 1.0; PCI-SIG; 2002; pp. 195-196.*

Malavalli, Kumar, "High Speed Fibre Channel Switching Fabric Services", *Proceedings of the SPIE, SPIE*, Bellingham, VA, USA vol. 1577,, XP000562869, ISSN: 0277-786X,(Sep. 4, 1991),216-226.

* cited by examiner

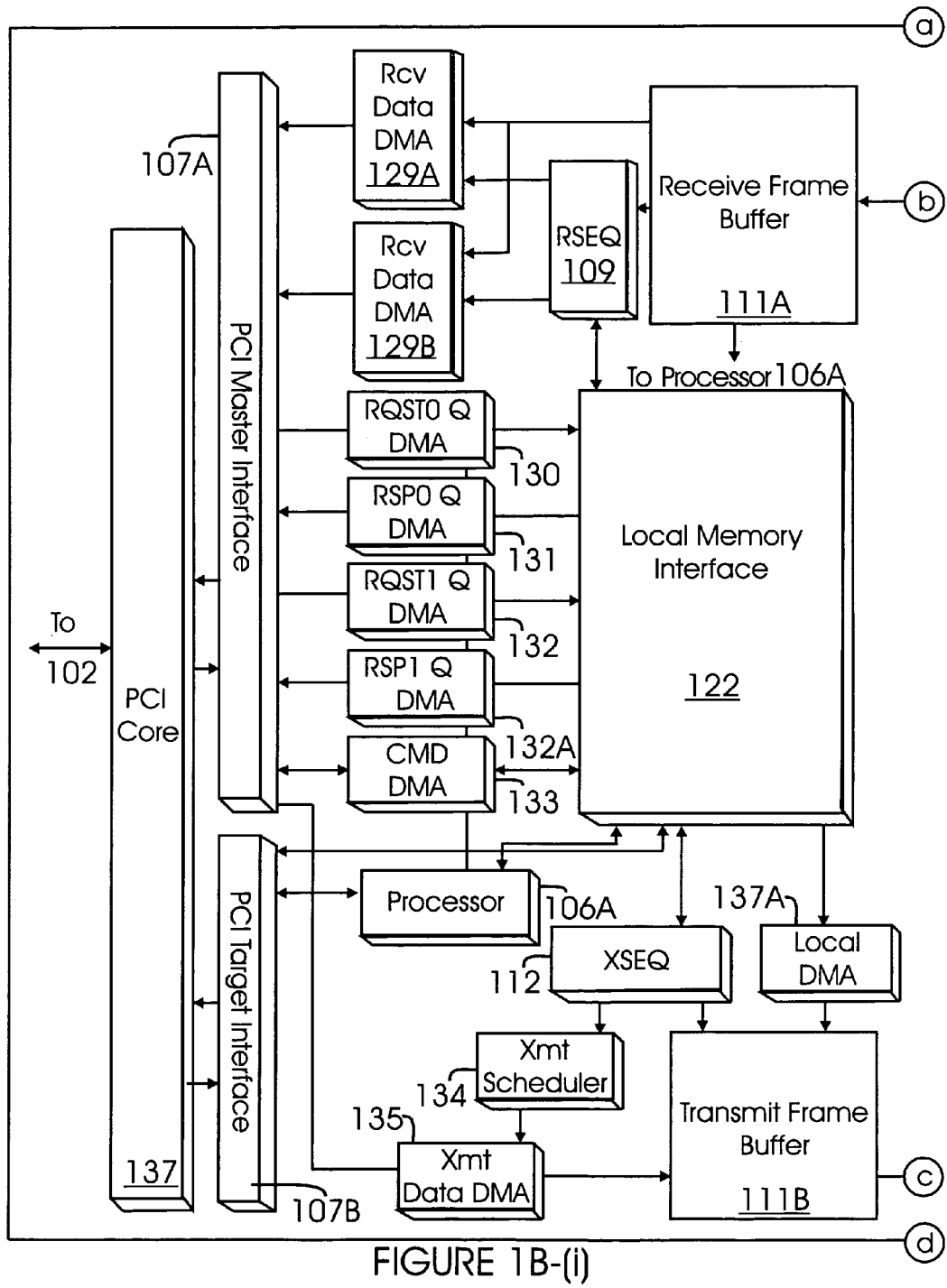
FIGURE 1B-(i)

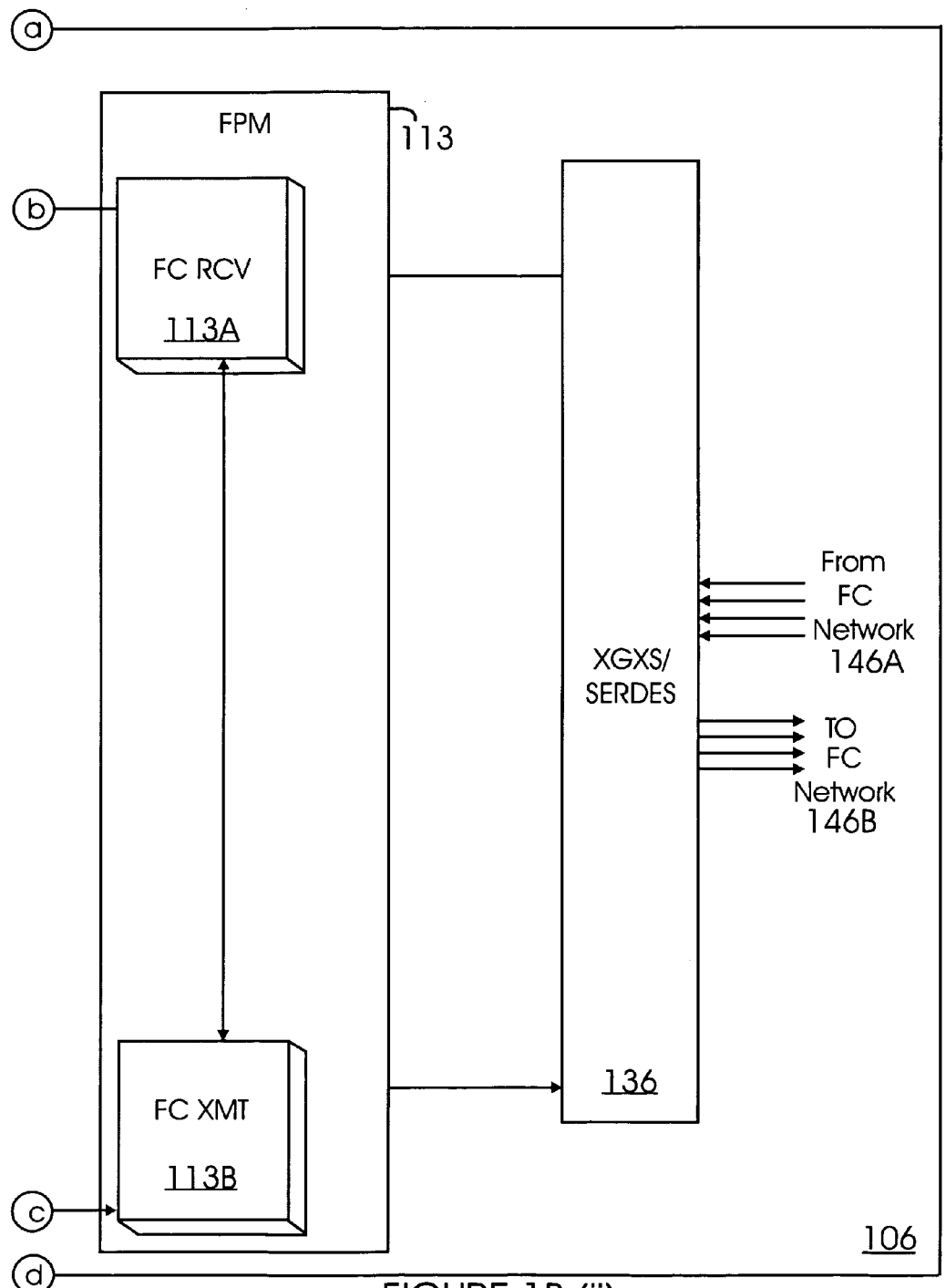
FIGURE 1B-(ii)

| Input Symbol | | Write Symbol Location | | Write Symbol Location+1 | | Read Symbol Location | | Read Symbol Location+1 | | Output Symbol | |
|---|---|---|---|---|---|---|---|---|---|---|---|
| LSM | NSB | Addr | Data | Addr | Data | Addr | Data | Addr | Data | LSB | NSB |
| D0.0 | D0.1 | 14 | - | 15 | - | 8 | - | 9 | - | - | - |
| D0.2 | D0.3 | 0 | D0.0 | 1 | D0.1 | 10 | - | 11 | - | - | - |
| D0.4 | D0.5 | 2 | D0.2 | 3 | D0.3 | 12 | - | 13 | - | - | - |
| D0.6 | D0.7 | 4 | D0.4 | 5 | D0.5 | 14 | - | 15 | - | - | - |
| D1.0 | D1.1 | 6 | D0.6 | 7 | D0.7 | 0 | D0.0 | 1 | D0.1 | D0.0 | D0.1 |
| D1.2 | D1.3 | 8 | D1.0 | 9 | D1.1 | 2 | D0.2 | 3 | D0.3 | D0.2 | D0.3 |
| D1.4 | D1.5 | 10 | D1.2 | 11 | D1.3 | 4 | D0.4 | 5 | D0.5 | D0.4 | D0.5 |
| D1.6 | D1.7 | 12 | D1.4 | 13 | D1.5 | 6 | D0.6 | 7 | D0.7 | D0.6 | D0.7 |
| COM | SKP | 14 | D1.6 | 15 | D1.7 | 8 | D1.0 | 9 | D1.1 | D1.0 | D1.1 |
| SKP | SKP | 0 | COM | 1 | SKIP | 10 | D1.2 | 11 | D1.3 | D1.2 | D1.3 |
| D2.0 | D2.1 | 1 | SKIP | 2 | D2.1 | 12 | D1.4 | 13 | D1.5 | D1.4 | D1.5 |
| D2.2 | D2.3 | 3 | D2.0 | 4 | D2.3 | 14 | D1.6 | 15 | D1.7 | D1.6 | D1.7 |
| D2.4 | D2.5 | 5 | D2.2 | 6 | D2.5 | 0 | COM | 1 | SKIP | COM | SKIP |
| D2.6 | D2.7 | 7 | D2.4 | 8 | D2.7 | 2 | SKIP | 3 | D2.0 | SKIP | D2.0 |
| D3.0 | D3.1 | 9 | D2.6 | 10 | D3.1 | 4 | D2.1 | 5 | D2.2 | D2.1 | D2.2 |
| - | - | 11 | D3.0 | 12 | - | 6 | D2.3 | 7 | D2.4 | D2.3 | D2.4 |
| - | - | 13 | - | 14 | - | | | 9 | D2.6 | | |

500

Table 1. Data Storage Operation with Skip Deletion

Figure 5A

| Input Symbol | | Write Symbol Location | | Write Symbol Location+1 | | Read Symbol Location | | Read Symbol Location+1 | | Output Symbol | |
|---|---|---|---|---|---|---|---|---|---|---|---|
| LSM | NSB | Addr | Data | Addr | Data | Addr | Data | Addr | Data | LSB | NSB |
| D0.0 | D0.1 | 14 | - | 15 | - | 8 | - | 9 | - | D2.0 | - |
| D0.2 | D0.3 | 0 | D0.0 | 1 | D0.1 | 10 | - | 11 | - | D2.0 | D2.1 |
| D0.4 | D0.5 | 2 | D0.2 | 3 | D0.3 | 12 | - | 13 | - | D2.4 | D2.3 |
| D0.6 | D0.7 | 4 | D0.4 | 5 | D0.5 | 14 | - | 15 | - | D2.6 | - |
| D1.0 | D1.1 | 6 | D0.6 | 7 | D0.7 | 0 | D0.0 | 1 | D0.1 | - | - |
| D1.2 | D1.3 | 8 | D1.0 | 9 | D1.1 | 2 | D0.2 | 3 | D0.3 | D0.0 | D0.1 |
| D1.4 | D1.5 | 10 | D1.2 | 11 | D1.3 | 4 | D0.4 | 5 | D0.5 | D0.2 | D0.3 |
| D1.6 | D1.7 | 12 | D1.4 | 13 | D1.5 | 6 | D0.6 | 7 | D0.7 | D0.4 | D0.5 |
| COM | SKP | 14 | D1.6 | 15 | D1.7 | 8 | D1.0 | 9 | D1.1 | D0.6 | D0.7 |
| SKP | SKP | 0 | COM | 1 | SKP | 10 | D1.2 | 11 | D1.3 | D1.0 | D1.1 |
| D2.0 | D2.1 | 2 | SKIP | 3 | SKIP | 12 | D1.4 | 13 | D1.5 | D1.2 | D1.3 |
| D2.2 | D2.3 | 4 | D2.0 | 5 | D2.1 | 14 | D1.6 | 15 | D1.7 | D1.4 | D1.5 |
| D2.4 | D2.5 | 6 | D2.2 | 7 | D2.3 | 0 | COM | 1 | SKIP | D1.6 | D1.7 |
| D2.6 | D2.7 | 8 | D2.4 | 9 | D2.5 | 1 | SKIP | 2 | SKIP | COM | SKIP |
| D3.0 | D3.1 | 10 | D2.6 | 11 | D2.7 | 3 | SKIP | 4 | D2.0 | SKIP | SKIP |
| - | - | 12 | D3.0 | 13 | D3.1 | 5 | D2.1 | 6 | D2.2 | SKIP | D2.0 |
| - | - | 14 | - | 15 | - | 7 | D2.3 | 8 | D2.4 | D2.3 | D2.2 |

Table 2. Data Storage Operation with Skip Addition

Figure 5B

ELASTIC BUFFER MODULE FOR PCI EXPRESS DEVICES

BACKGROUND

1. Field of the Invention

The present invention relates to computing systems, and more particularly, to an elastic buffer module used in PCI Express devices.

2. Background of the Invention

Computing systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with peripheral devices via an interface such as the Peripheral Component Interconnect ("PCI") interface, a local bus standard using parallel data transfer that was developed by Intel Corporation®, or the extension of PCI known as PCI-X. More recently, PCI Express, a standard interface incorporating PCI transaction protocols at the logical level, but using serial data transfer at the physical level has been developed to offer better performance than PCI or PCI-X.

Host systems are used in various network applications, including storage area networks ("SANs"). In SANs, plural memory storage devices are made available to various host computing systems. Data in a SAN is typically moved between plural host systems and storage systems (or storage devices, used interchangeably throughout this specification) through various controllers/adapters, for example, host bus adapters ("HBAs").

HBAs (a PCI Express device) that are placed in SANs receive serial data streams (bit stream), align the serial data and then convert it into parallel data for processing, as described above. HBAs operate as a transmitting device as well as the receiving device.

PCI Express is an Input/Output ("I/O") bus standard (incorporated herein by reference in its entirety) that is compatible with existing PCI cards using the PCI Express bus. PCI-Express uses discrete logical layers to process inbound and outbound information. In the PCI-Express terminology, a serial connection between two devices is referred to as a link.

Various other standard interfaces are also used to move data between host systems and peripheral devices. Fibre Channel is one such standard. Fibre Channel (incorporated herein by reference in its entirety) is an American National Standard Institute (ANSI) set of standards, which provides a serial transmission protocol for storage and network protocols.

PCI Express, Fibre Channel and other serial interfaces use 8-bit to 10-bit encoding, in which each 8-bit character of source data is encoded into a 10-bit symbol prior to transmission. A receiving device to recover the original 8-bit character decodes the 10-bit data.

In order to recover data from a serial bit stream, the receiving PCI Express device performs clock recovery, de-serialization and symbol lock. In clock recovery, the receiving device generates a serial bit clock that is phase locked to the incoming serial bit stream. This is also known as bit synchronization. For de-serialization, the recovered clock is used to sample the incoming serial bit stream and convert it into parallel data. For symbol lock, the boundary between consecutive 10-bit symbols is determined and the de-serialized data is aligned to the boundary. After the symbol lock, the 10-bit data is sent to an Elastic Buffer module (may also be referred to as Elastic Buffer) and then the 10-bit data is decoded to 8-bit for further processing.

The Elastic Buffer, using a first-in-first-out memory space (for example, a circular buffer), typically receives symbols from a symbol lock module at the rate of one symbol/clock (for example, receive clock rate) and forwards symbols to other modules at another clock rate (for example, system clock rate). PCI Express allows the difference between clock rates to be up to 600 ppm. Clock rate compensation is used to control data flow from/to the elastic buffer.

The PCI Express standard allows a PCI Express device to insert or delete special symbols so that the elastic buffer does not overflow or under flow depending on the rate difference between the receive and system clocks. The underflow condition occurs when the system clock is faster than the receive clock, while the overflow condition occurs when the receive clock is faster than the system clock. One such symbol is the SKIP symbol (defined by the PCI Express standard) within a SKIP ordered set.

Typically, the elastic buffer uses the difference between a write and read pointer to determine the amount of information in the buffer. The write pointer indicates the location where the received data from the symbol lock module is written in the elastic buffer, while the read pointer indicates the storage location from where data is read from the elastic buffer. Once the difference is known, SKIP symbols may be inserted/deleted to avoid overflow/underflow conditions. However, the read and write pointers operate in different clock domains (system and receive clock domains) and hence the difference calculation itself may have errors. The deletion/insertion of SKIP symbols based on the erroneous calculation is not able to solve the underflow/overflow conditions when the data rate difference is operating at the theoretical limit. This theoretical limit is determined by the size of the Elastic Buffer and the maximum clock rate difference possible as specified in the PCI Express specification.

Therefore, there is a need for a method and system for efficiently managing underflow/overflow conditions in an elastic buffer.

SUMMARY OF THE INVENTION

In one aspect, a PCI Express device with an elastic buffer is provided. The elastic buffer includes, a buffer control module that determines a difference between a write and read pointer value and compares the difference to a threshold value for inserting or deleting a standard symbol, wherein the threshold value is adjusted dynamically based on a slow or fast clock speed. The standard symbol is a PCI Express SKIP symbol.

In another aspect of the present invention, a method for PCI Express devices is provided. The method includes, determining if a clock speed is slow, wherein a monitoring register value indicates if a clock speed is slow; selecting a threshold value based on the monitoring register value; and inserting or deleting a standard symbol based on a comparison of a difference between a write and read pointer and the threshold value.

In yet another aspect, a host bus adapter ("HBA") operating as a PCI Express device is provided. The HBA includes, an elastic buffer module with a buffer control module that determines a difference between a write and read pointer value and compares the difference to a threshold value for inserting or deleting a standard symbol, wherein the threshold value is adjusted dynamically based on a slow or fast clock speed.

In yet another aspect, a network with an HBA operating as a PCI Express device is provided. The HBA includes an elastic buffer module with a buffer control module that determines a difference between a write and read pointer value and compares the difference to a threshold value for inserting or deleting a standard symbol, wherein the threshold value is adjusted dynamically based on a slow or fast clock speed.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1B (shown as 1B(i)-1B(ii)) shows a block diagram of a HBA, used according to one aspect of the present invention;

FIGS. 5A and 5B show tables for SKIP deletion and insertion, using the elastic buffer module of FIG. 3.

DETAILED DESCRIPTION OF THE PREFERRED EMBODIMENTS

To facilitate an understanding of the preferred embodiment, the general architecture and operation of a host system/HBA/PCI-Express device will be described. The specific architecture and operation of the preferred embodiment will then be described with reference to the general architecture.

Figure 1A:
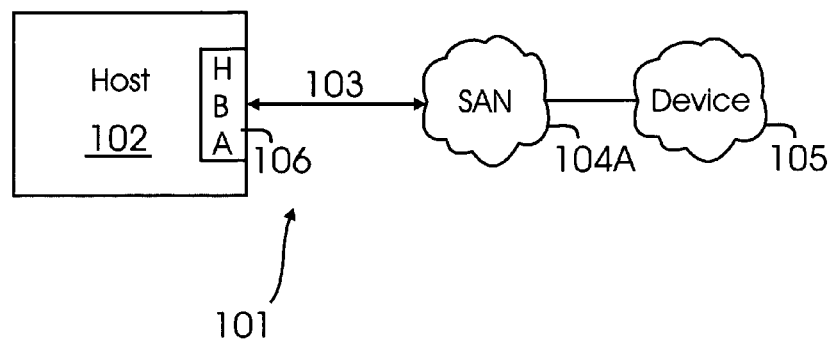
FIG. 1A shows a block diagram of a host system communicating with a device.

Host System/HBA:

FIG. 1A shows a block diagram of a system 101 where a host computing system 102 is coupled to a storage device 105 via a SAN 104A. HBA 106 facilitates data transfer between host 102 and device 105 via link 103.

FIG. 1B shows a block diagram of HBA 106. Adapter 106 includes processors (may also be referred to as "sequencers") "RSEQ" 109 and "XSEQ" 112 for receive and transmit side, respectively for processing data received from storage sub-systems and transmitting data to storage sub-systems. Transmit path in this context means data path from a host memory (not shown) to the storage systems via adapter 106. Receive path means data path from storage subsystem via adapter 106. Buffers 111A and 111B are used to store information in receive and transmit paths, respectively.

In addition to the dedicated processors on the receive and transmit path, adapter 106 also includes processor 106A, which may be a reduced instruction set computer ("RISC") for performing various functions in adapter 106.

Adapter 106 also includes fibre channel interface (also referred to as fibre channel protocol manager "FPM") 113 that includes modules 113A and 113B in receive and transmit paths, respectively (shown as "FC RCV" and "FC XMT"). Modules 113A and 113B allow data to move to/from storage systems and are described below in detail. Frames 146A are received from a fibre channel network, while frames 146B are transmitted to the fibre channel network.

Adapter 106 is also coupled to external memory (not shown) and local memory interface 122. Memory interface 122 is provided for managing local memory. Local DMA module 137A is used for gaining access to a channel to move data from local memory. Adapter 106 also includes a serial/de-serializer (shown as "XGXS/SERDES") 136 for converting data from 10-bit to 8-bit format and vice-versa.

Adapter 106 also includes request queue DMA channel (0) 130, response queue (0) DMA channel 131, response queue (1) 132A, and request queue (1) DMA channel 132 that interface with request queue (not shown and response queue (not shown); and a Command DMA channel 133 for managing Command information. DMA channels are coupled to an arbiter module (not shown) that receives requests and grants access to a certain channel.

Both receive and transmit paths have DMA modules "RCV DATA DMA" 129A and 129B and "XMT DATA DMA" 135 that are used to gain access to a channel for data transfer in the receive/transmit paths. Transmit path also has a scheduler 134 that is coupled to processor 112 and schedules transmit operations.

PCI master interface 107A and PCI target interface 107B are both coupled to PCI Express Core logic 137 (may also be referred to as "logic 137" or "module 137"). Interface 107A and 107B includes an arbitration module that processes DMA access to plural DMA channels.

It is noteworthy that the present invention is not limited to the foregoing architecture of HBA 106, and other architectures/configurations may be used to implement the adaptive aspects of the present invention.

Figure 1C:
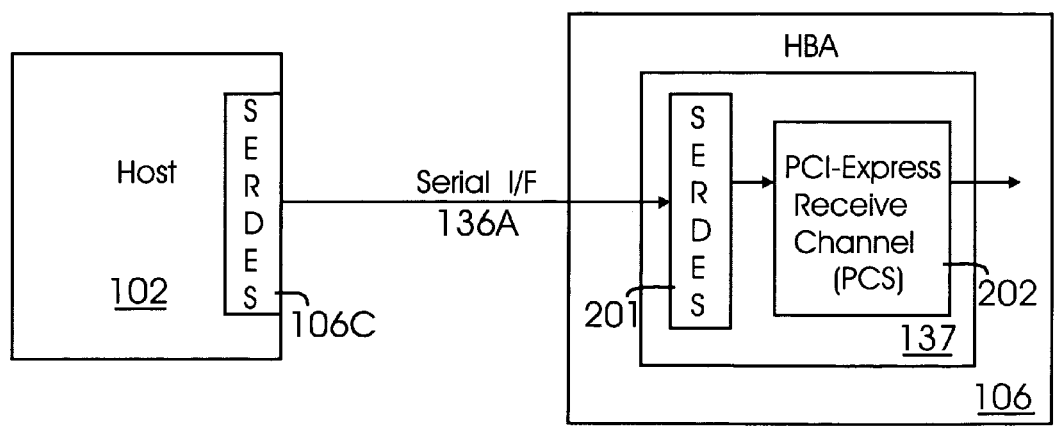
FIG. 1C shows a block diagram of a HBA with a PCS module, used according to one aspect of the present invention.
Figure 1D:
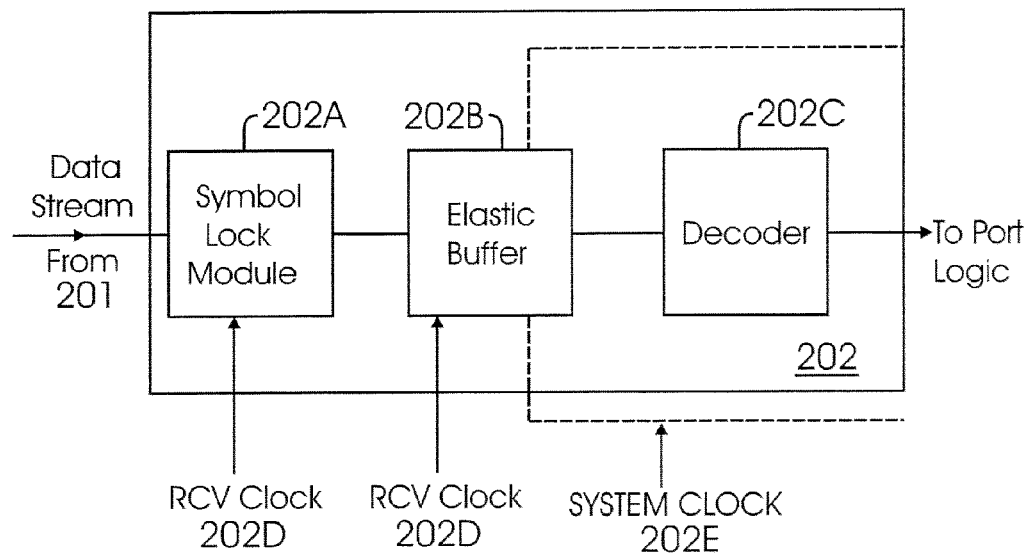
FIG. 1D shows a block diagram of a PCS module, according to one aspect of the present invention.
Figure 1F:
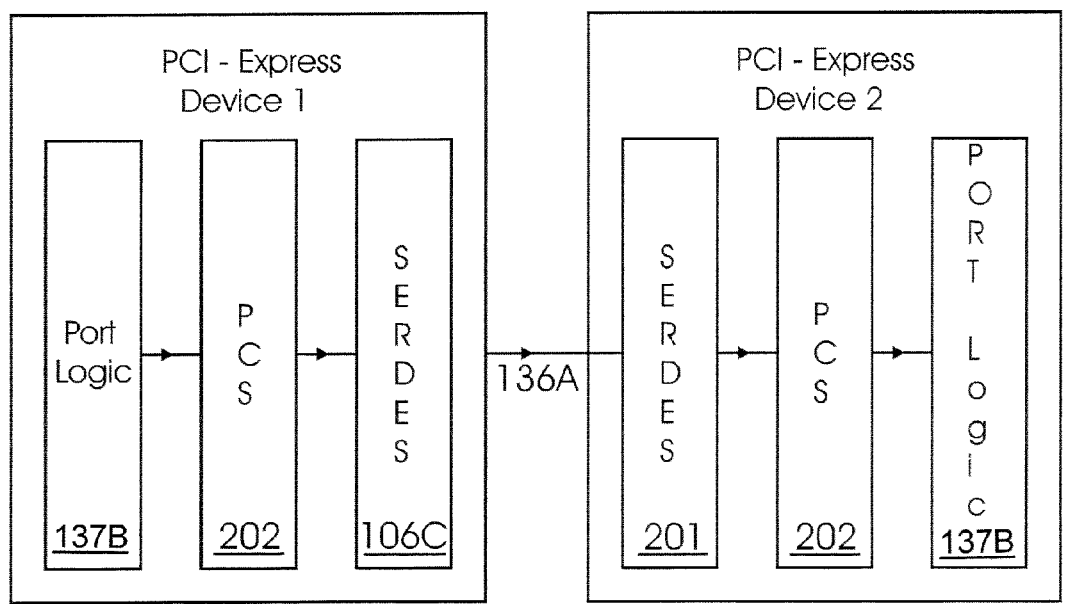
FIG. 1F shows two PCI Express devices communicating with each other.
Figure 1E:
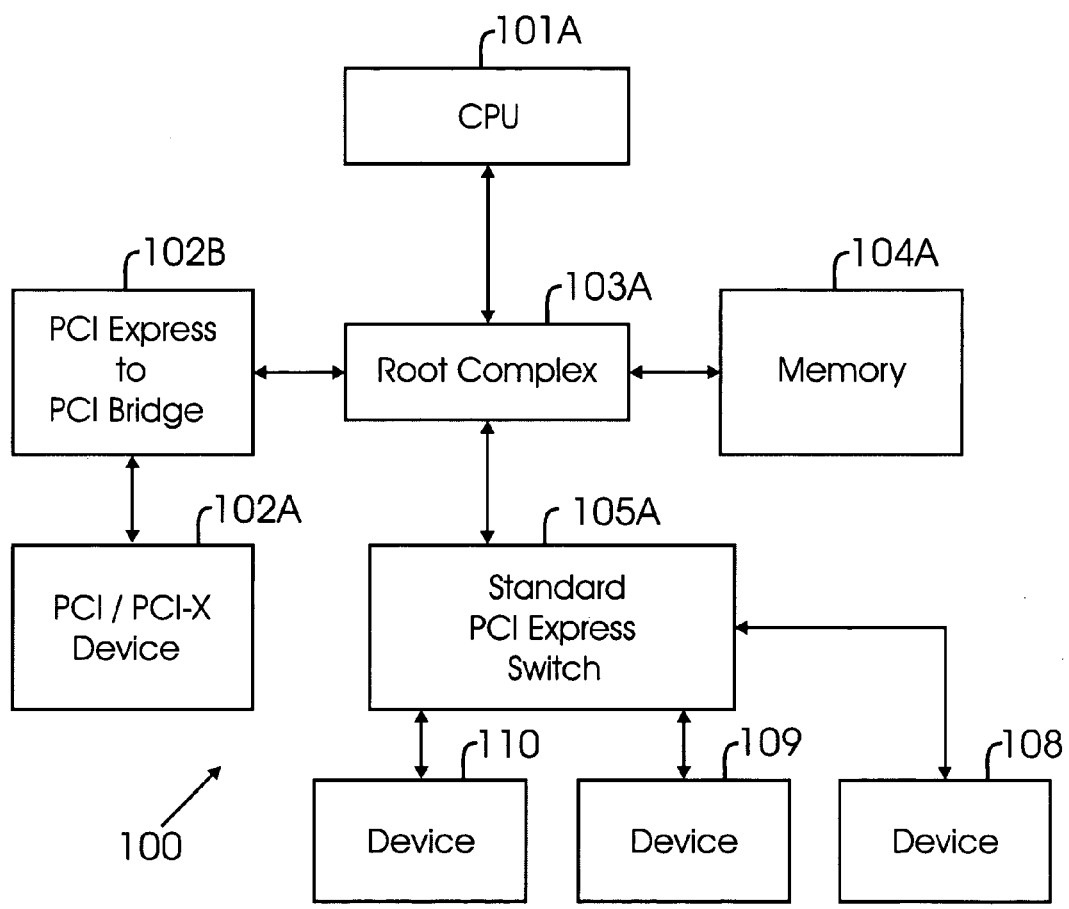
FIG. 1E shows an example of PCI Express system.

PCI Express Overview:

FIG. 1E shows a block diagram of a PCI Express standard fabric topology 100. A central processing unit ("CPU") 101A (part of a computing or host system) is coupled to a "root complex" 103A. Root complex 103A as defined by the PCI Express standard is an entity that includes a Host Bridge and one or more Root Ports. The Host Bridge connects a CPU to a Hierarchy; wherein a Hierarchy is the tree structure of the PCI Express topology.

Root complex 103A is coupled to a PCI Express/PCI bridge 102B that allows CPU 101A to access a PCI (or PCI-X) device 102A. Memory 104A is also coupled to root complex 103A and is accessible to CPU 101A.

In addition, Root complex 103A connects to a standard PCI Express switch 105A (may be referred to as "switch") that is in turn connected to devices 108-110. CPU 101A can communicate with any of the devices 108-110 via switch 105A. It is noteworthy that the path between root complex 103A and any of devices 108-110 may be a direct path with no switch, or it may contain multiple cascaded switches.

Figure 1G:
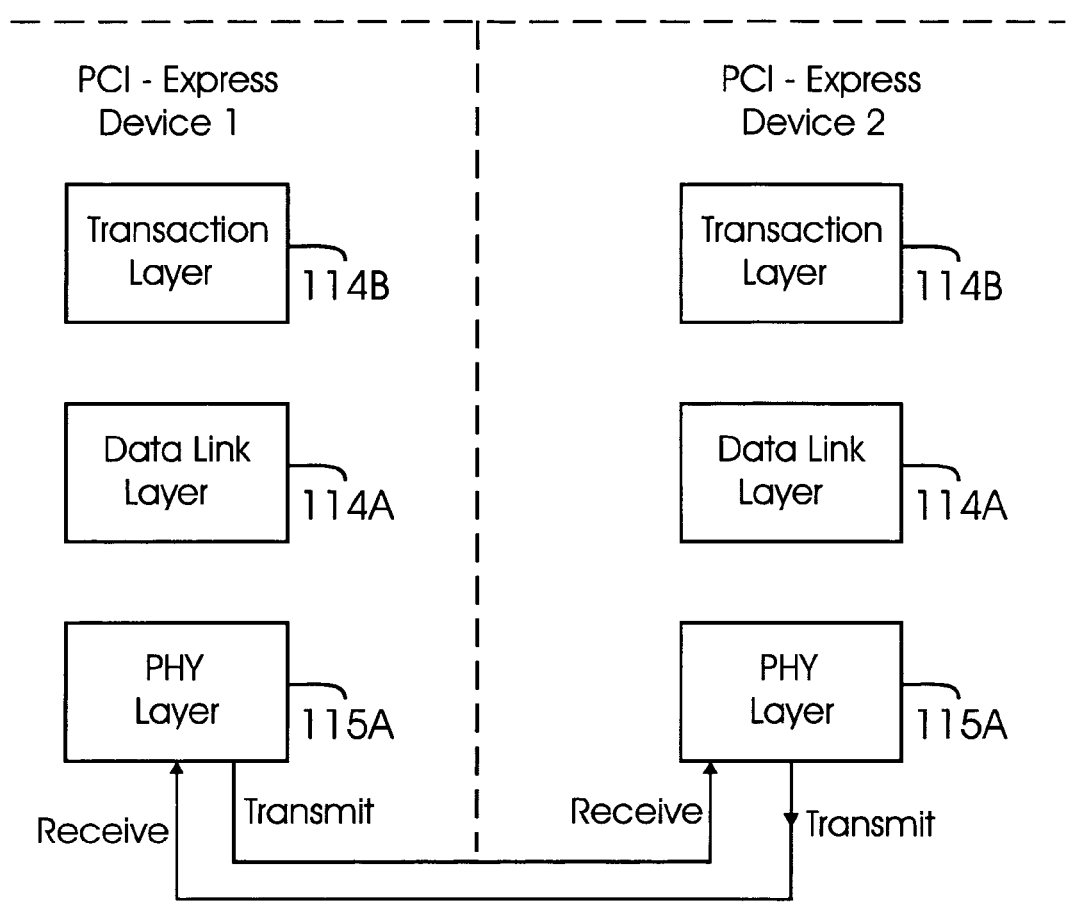
FIG. 1G shows the layers used by PCI Express devices to communicate with each other.

PCI Express uses discrete logical layers to process inbound and outbound information. The logical layers are the Transaction Layer 114B, Data Link Layer ("DLL") 114A and a Physical Layer ("PHY") 115A, as shown in FIG. 1G. A receive side communicates with a transmit side.

PCI Express uses a packet-based protocol to exchange information between Transaction layers 114B. Transactions are carried out using Requests and Completions. Completions are used only when required, for example, to return read data or to acknowledge completion of an I/O operation.

At the transmit side, packets flow from the Transaction Layer 114B to PHY 115A. On the receive side, packets are processed by the PHY layer 115A and sent to the Transaction layer 114B for processing. DLL 114A serves as an intermediate layer between PHY layer 115A and Transaction layer 114B.

The Transaction Layer 114B assembles and disassembles Transaction Layer Packets ("TLPs"). TLPs are used to communicate transactions, such as read and write and other type of events.

FIG. 1C shows a block diagram of a system with host 102 interfacing with HBA 106 having logic 137. Logic 137 includes a serial/de-serializer 201 and a PCI Express receive channel ("PCS") 202 that are described below in detail.

Host 102 sends encoded serial data (bit streams) via serdes 106C and serial interface 136A. Serdes 201 receives the incoming data stream and passes the data stream to PCS 202.

Elastic Buffer 202B:

FIG. 1D shows a block diagram of PCS 202 with a symbol lock module 202A (also referred to as "module 202A"), an elastic buffer (may also be referred to as "buffer" 202B) 202B and a decoder 202C. Module 202A operates in a receive clock domain (shown as RCV Clock 202D), while buffer 202B has parts that operate in RCV clock domain 202D, and other parts in system clock domain 202E.

Module 202A receives raw bit stream data from serdes 201, and determines the appropriate symbol boundary using the Comma symbol and then properly aligns the received data. Based on the location of the Comma character, incoming bits are aligned and then stored in buffer 202B. Buffer 202B includes any type of memory (for example, a circular FIFO based buffer) for storing the aligned bit stream data.

Decoder 202C takes the aligned data from buffer 202B and decodes 10-bit data to 8-bit data. The decoded 8-bit data is then sent to other components in HBA 106 (or any other PCI Express device) for processing.

Although the example of FIG. 1D is given with respect to an HBA, the present invention is applicable to any PCI Express device. The general architecture with respect to PCI Express devices is shown in FIG. 1F, where PCI Express device 1 communicates with PCI Express device 2 using the serial interface 136A.

In this configuration, Port Logic 137B in PCI Express Device 1 transmits PCI Express data which is encoded in PCS 202 and serialized in serdes 106C. Serdes 106C transmits a serial bit stream to serdes 201 where it is deserialized. PCS 20 in PCI Express Device 2 decodes the data. The port logic 137B in PCI Express device 2 receives the decoded data from PCS 202. It is noteworthy that each PCI Express device contains both a transmit channel and a receive channel even though FIG. 1F only shows the transmit channel of PCI Express Device 1 and the receive channel of PCI Express Device 2.

Figure 2A:
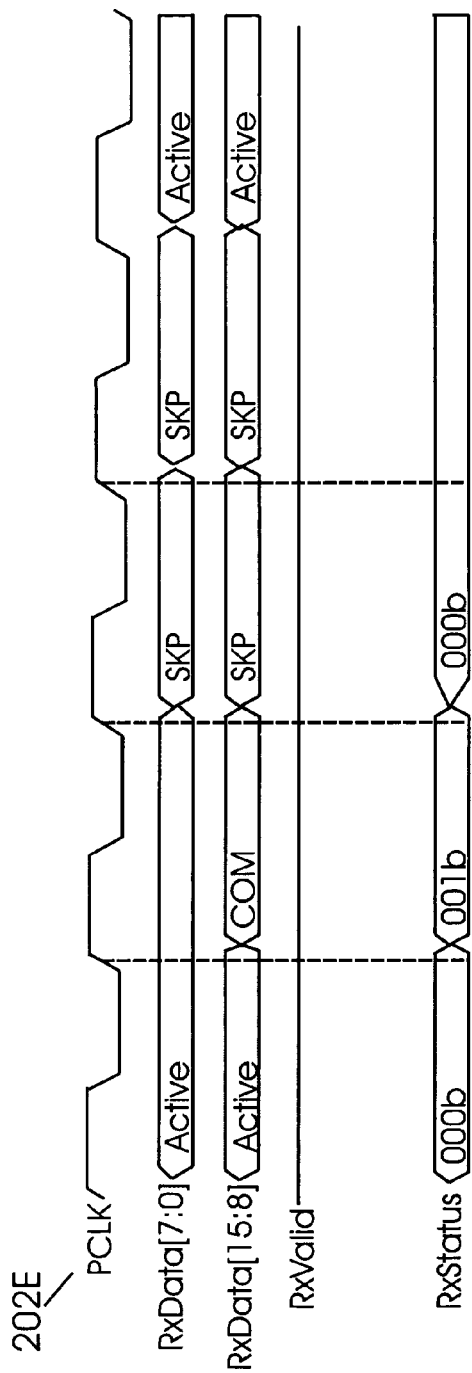
FIGS. 2A and 2B show timing diagrams for SKIP deletion and insertion for PCI Express devices.
Figure 2B:
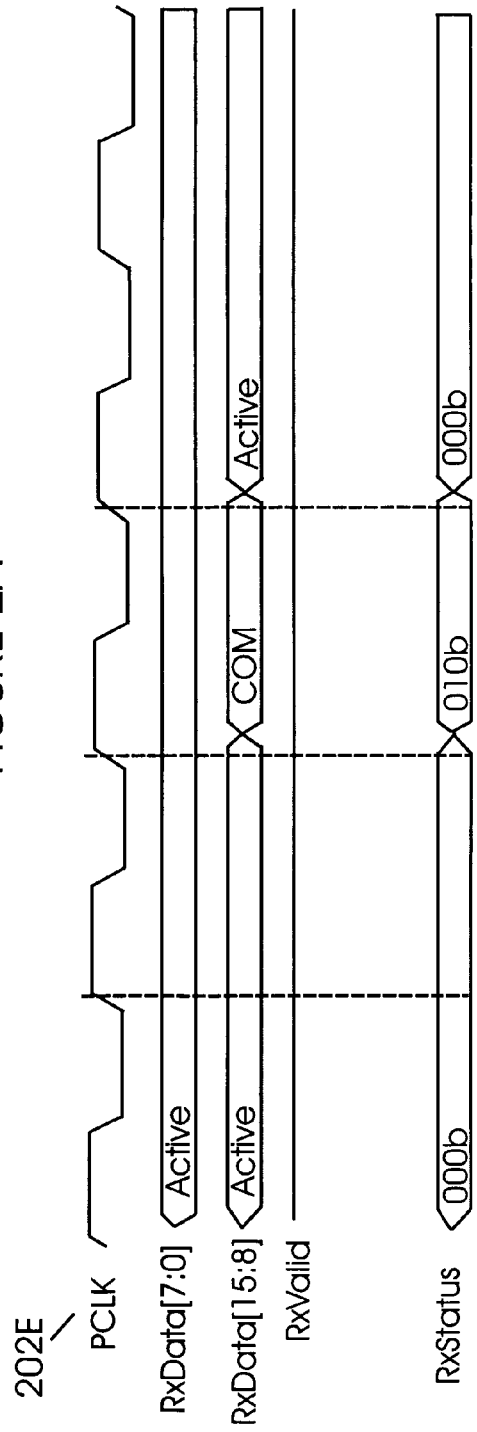

FIG. 2A shows a timing diagram in which a single SKIP symbol is added to a Skip Ordered Set that originally contained three SKIP symbols, resulting in a new Skip Ordered Set containing four SKIP symbols. FIG. 2B shows a timing diagram in which a single SKIP symbol was removed from a Skip Ordered Set containing one SKIP symbol, resulting in an output in which no SKIP symbols are present.

In addition to the symbol output, the Elastic Buffer 202B provides status information on a RxStatus bus (not shown), describing if and when a buffer correction was performed and if a SKIP symbol was added or removed. In addition to supplying Receive status information, an RxValid signal indicates that the buffer 202B is currently receiving information from module 202A. RxValid is active when the RxData signals contain valid information.

Figure 3I:
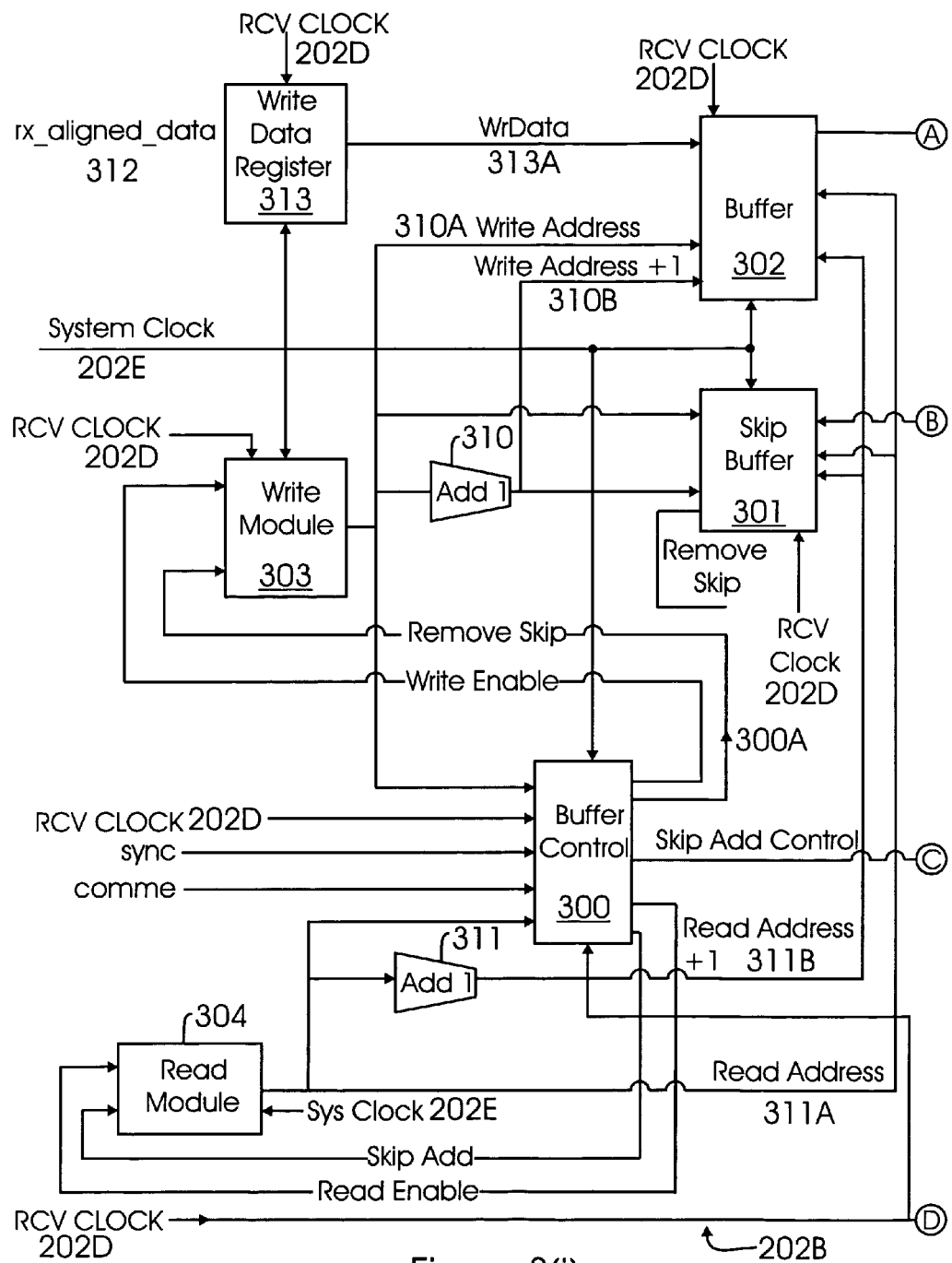
FIG. 3 shows a block diagram of an elastic buffer module, according to one aspect of the present invention.
Figure 3:
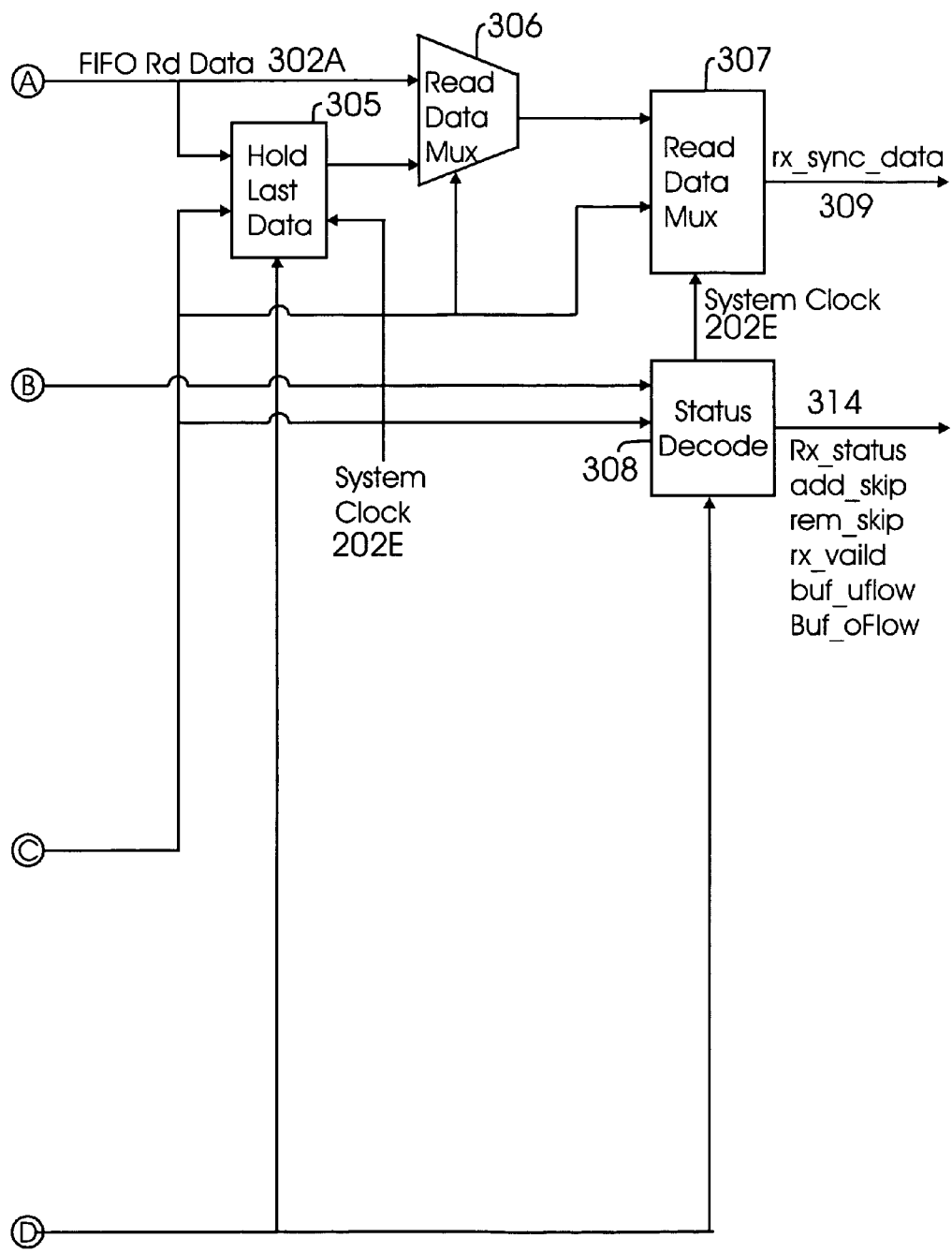

FIG. 3 shows a detailed block diagram for elastic buffer 202B. Elastic buffer 202B includes a memory 302 (for example, a circular buffer) for storing symbols. In one configuration memory 302 is a quad-port, dual access, random access memory, where two symbols may be written and read at the same time.

A write data register 313 that operates in the RCV clock 202D domain receives aligned data 312 from module 202A. Write module 303 (may also be referred to as "module 303") via module 310, generates a write address 310A for the first word that is written into buffer 302. For a second or next word, module 303 generates a write address +1 (shown as 310B). Based on these addresses, data 313A is written in buffer 302. As information from the write data register 313 is stored into memory, the write address register 310A increments by two in preparation for the next data word.

Buffer 302 operates both under the RCV clock 202D domain and system clock 202E domain; for example, the FIFO read operation (shown as 302A) operates in the system clock 202E domain while the write operation is in the RCV clock 202D domain.

Buffer control module 300 that operates in the system clock 202E domain, controls the overall writing/reading of buffer 302. If a SKIP symbol needs to be deleted, then the information is maintained in register 301 (that operates in the RCV clock 202D domain) based on a control signal 300A that is sent to module 303 and register 301.

Read module 304 operates in the RCV clock domain 202D generating the address information to read information from buffer 302. The address is generated by module 311 and is shown as 311A (for the first word) and 311B (for the second word).

When a SKIP symbol is being inserted, then data is held in register 305. Register 305 operates in the system clock 202E domain. Multiplexer 306 controls the data that is read out and placed in register 307. Data 309 is then sent to decoder 202C.

A status decode module 308 generates a status signal 314 every time a SKIP symbol is added to or deleted from the buffer.

Figure 4:
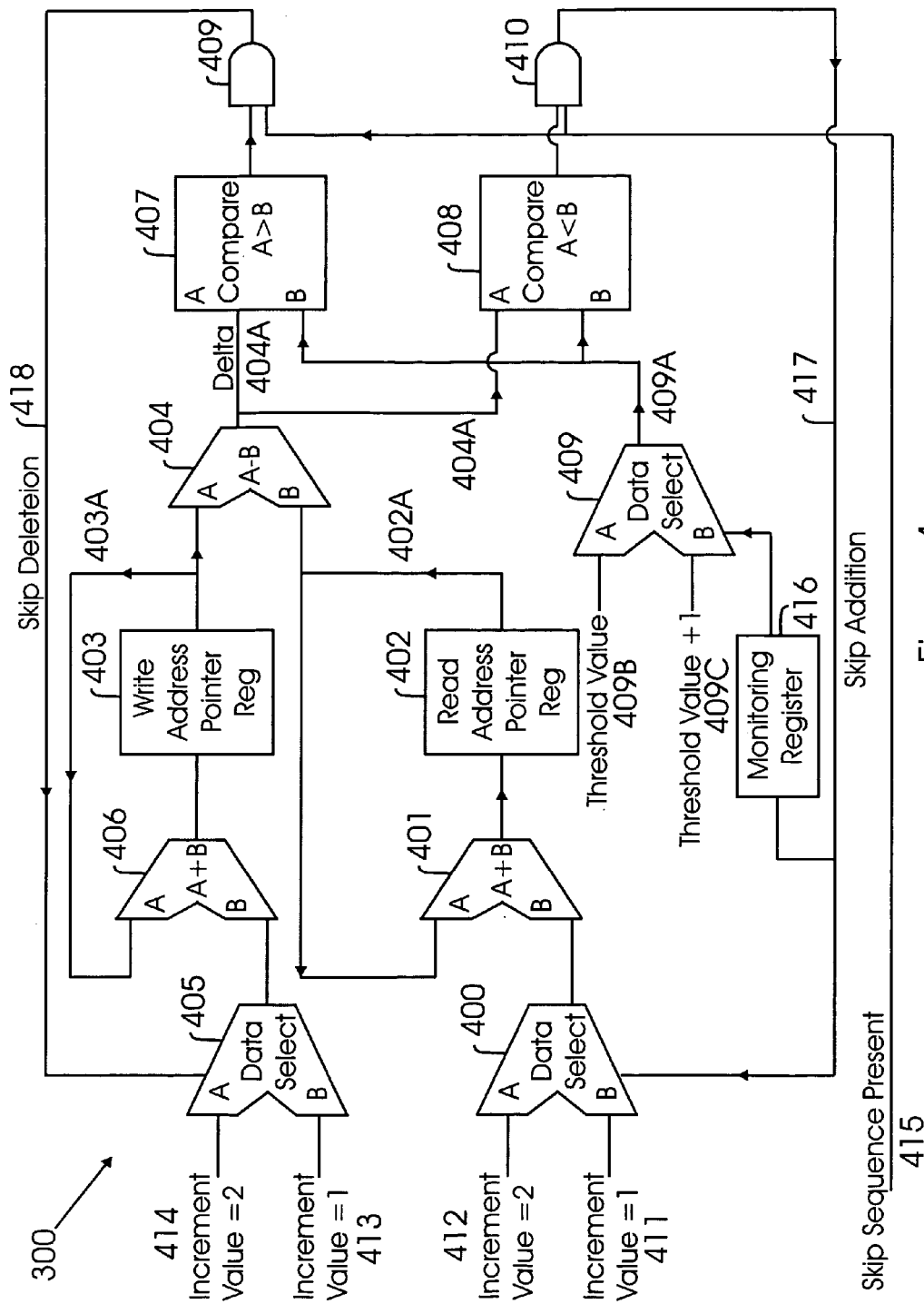
FIG. 4 shows block diagram of a buffer controller used in the elastic buffer module of FIG. 3.

FIG. 4 shows a block diagram of buffer control module 300, which controls the operation of Elastic Buffer 202B including the insertion and removal of SKIP symbols.

As shown in FIG. 4, a write address pointer register 403 stores write pointer values that are received from adder 406. Register 403 value 403A (shown as "A" in adder 406) at any given time is incremented by a value "B" by adder 406. This value B is based on input 413 or 414 provided by data select module 405. If input 413 is selected, then 403A is incremented (or increased) by "1". If input 414 is selected, then 403A is increased by 2.

Read pointer values received from adder 401 are stored in register 402. Register 402 output value 402A (shown as "A" in adder 401) at any given time is incremented by a value "B". This value B is based on input 411 or 412 provided by data select module 400. If input 411 is selected, then 402A is incremented (or increased) by "1". If input 412 is selected, then 402A is increased by 2.

It is noteworthy that input values 411-414 may be hard-wired or programmed.

The read pointer value 402A is subtracted from the write pointer value 403A by logic 404 and the difference (or delta) 404A is sent to a comparator 407. Comparator 407 compares the delta 404A with a threshold value 409A received from data select module 409. If the difference 404A is greater than threshold value 409A, then logic 409 (also referred to as data select module) generates a SKIP deletion signal 418, if a SKIP sequence is present, indicated by signal 415.

Signal 418 when active is sent to data select module 405. This selects input 413 to increment the write pointer value 413A by 1, instead of 2, for normal two-word operation. Incrementing the write pointer by 1 eliminates one SKIP symbol from the storage process. The modified result from the adder module 406 is stored in the write address register 403, which determines the next memory location for data storage.

Comparator 408 detects if 404A is less than the threshold value 409A. If yes, then logic 410 generates a SKIP addition signal 417. SKIP addition signal 417, when active is sent to data select module 400 and that uses input value 411 to increment the read pointer value 402A by 1, instead of 2, for normal two word operation. Incrementing the read pointer by 1 adds one SKIP symbol at the buffer output by duplicating or repeating the previous data value. The modified result from the adder module 401 is stored in the read address pointer 402, which determines the next memory location for access.

It is noteworthy that comparators 407 and 408 have been shown as separate functional blocks to clarify the adaptive aspects of the present invention. Blocks 407 and 408 may be based within the same physical comparator.

Monitoring register 416 examines the difference between the RCV clock 202D and the system clock 202E, holding a value which indicates that the RCV clock 202D rate is slower than that of the system clock 202E. Based on the stored values, data select module 409 selects the appropriate threshold value, i.e., 409B or 409C.

If the RCV clock rate is slower than that of the system clock, the value stored in monitor register 416 selects a higher threshold value via data select module 409. Increasing the threshold value, if the receive clock is slow, allows buffer controller 300 to process more SKIP additions and thus provides additional storage margin. This rate measurement process is performed on every clock cycle, and hence the threshold value is dynamically adjusted. If the RCV clock 202D increases, then threshold value 409B is used.

FIG. 5A shows Table 1 for data storage operation with SKIP deletions. When the SKIP sequence is detected, the first SKIP symbol following the comma symbol is removed by advancing the address counter (303) by one rather than two.

FIG. 5B shows a Table 2 for SKIP symbol addition (shown as 502 and 503). A SKIP symbol is inserted based on the difference between 404A and 409A. When this occurs, the read address pointer that is normally increased by two is increased by one.

Figure 6A:
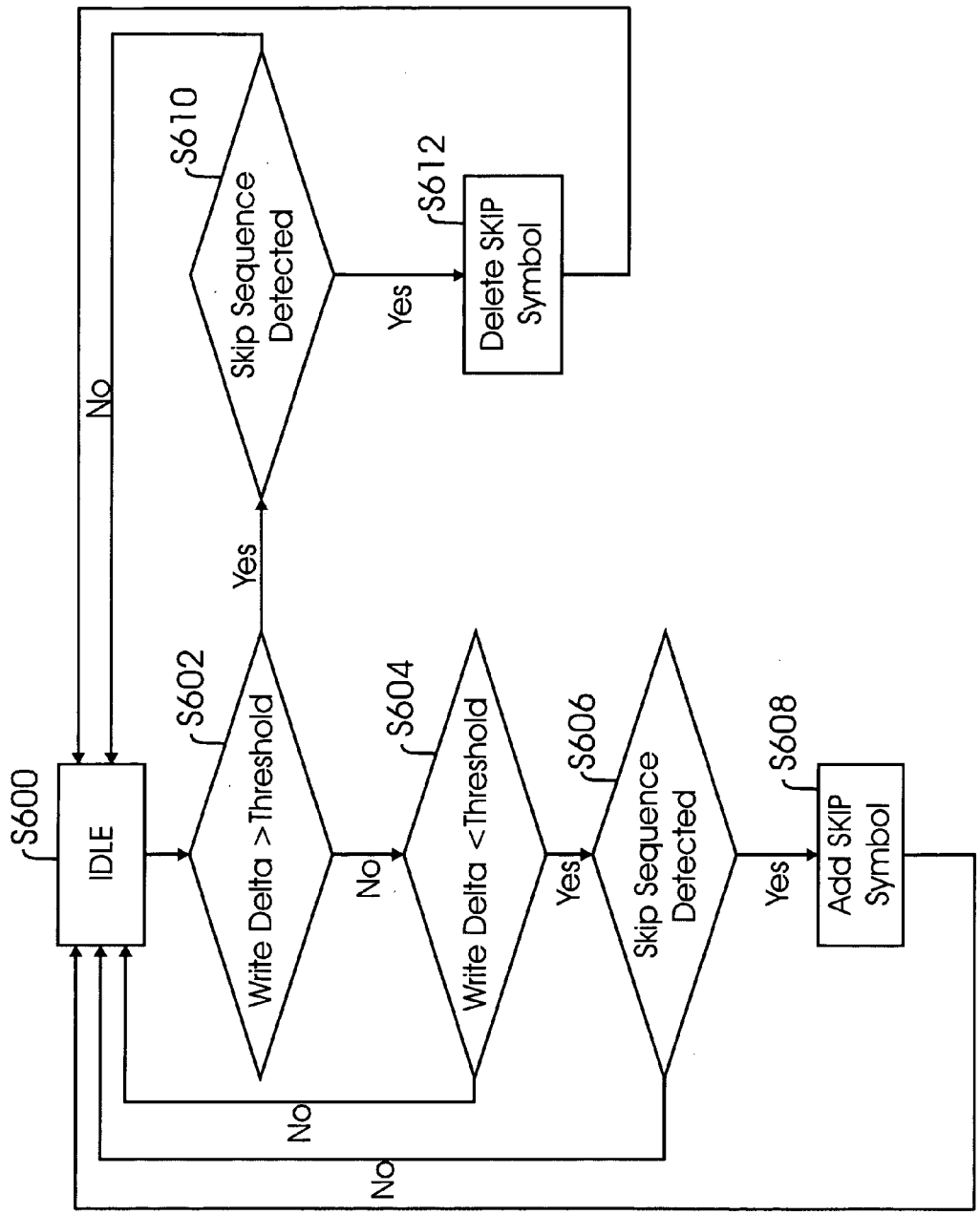
FIGS. 6A, 6B and 7 show process flow diagrams that enable insertion and deletion of known symbol characters, according to one aspect of the present invention.

Process Flow:

FIG. 6A shows a process flow diagram for overall control implemented by buffer controller 300. In step S600, the process is idle allowing normal buffer read and write operations. Under normal operation, the read and write address pointers increment or advance by two enabling dual symbols to be read from or written into the buffer 302.

In step S602, buffer controller 300 determines if the write delta (i.e. 404A in FIG. 4) is greater than a threshold value (409A). If the delta 404A is greater than the threshold value, then in step S610 the input data is examined to determine if a SKIP ordered set is being received. If a Skip Ordered Set is present, then the process advances to S612 and the SKIP symbol is removed from the input buffer by reducing the increment value provided to the write pointer to one rather than two.

If process step S610, determines that a Skip Ordered Set is not available, then the process reverts to the Idle State in S600.

If in process step S602, the write delta (404A) is not greater than the threshold value, then the process moves to step S604, where a determination is made to see if the delta value 404A is less than the threshold value 409A. If the result is false, the process returns to S600.

While in process step S604, if the write delta 404A is less than the threshold value, then in step S606, the process determines if a Skip Ordered Set is being received. If a Skip Ordered set is not available, then the process reverts back to the Idle State in S600. If, a Skip Ordered Set is present, then in step S608, a SKIP symbol is inserted into the buffer 302 output. SKIP symbol insertion is accomplished in S608 by incrementing the read pointer by 1, rather than two, and duplicating the last symbol read from buffer 302, which is a SKIP symbol.

Figure 6B:
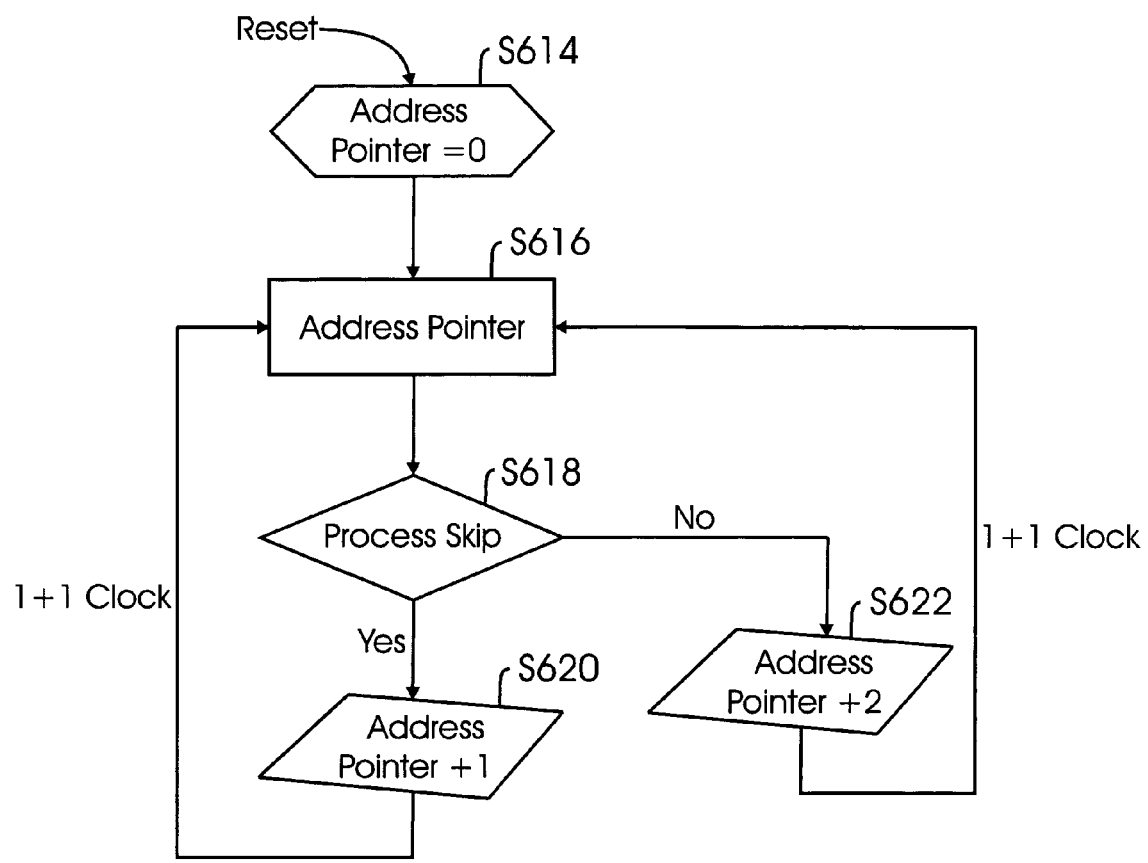

FIG. 6B shows a process flow diagram for adjusting the address pointers, according to one aspect of the present invention. In step S614, the address pointer (read and/or write) is initialized to a value of 0, according to one aspect of this invention. In step S616, the address information is presented to buffer memory 302 and information is either written into or read from a specified location.

In step S618, the process determines if a SKIP insertion or deletion is needed. If Skip Order Set Modification is not needed, then in step S622, the pointers (both read and write) are increased by two. If SKIP addition or deletion is needed, then in step S620, one of the pointers (read or write) is increased by one. Increasing the write pointer by one rather than two creates additional storage space since one symbol from the Skip Order Set is not stored in buffer 302. Eliminating symbols from the storage process effectively provides more available space in buffer 302.

During normal operation, the read pointer is increased by two since dual symbols are fetched from buffer 302 and sent to data decode module 202C. If a SKIP insertion is needed, then the read pointer only advances by 1. This forces duplicate symbol insertion in buffer 302 output. Also, since the read pointer only advances by 1, less information is read from the buffer 302, which increases the amount of information stored.

It is noteworthy that the foregoing illustrations where the pointer values are increased by 1, instead of 2, are only to illustrate the adaptive aspects of the present invention. Other values may be used to increase/decrease the pointer values.

Figure 7:
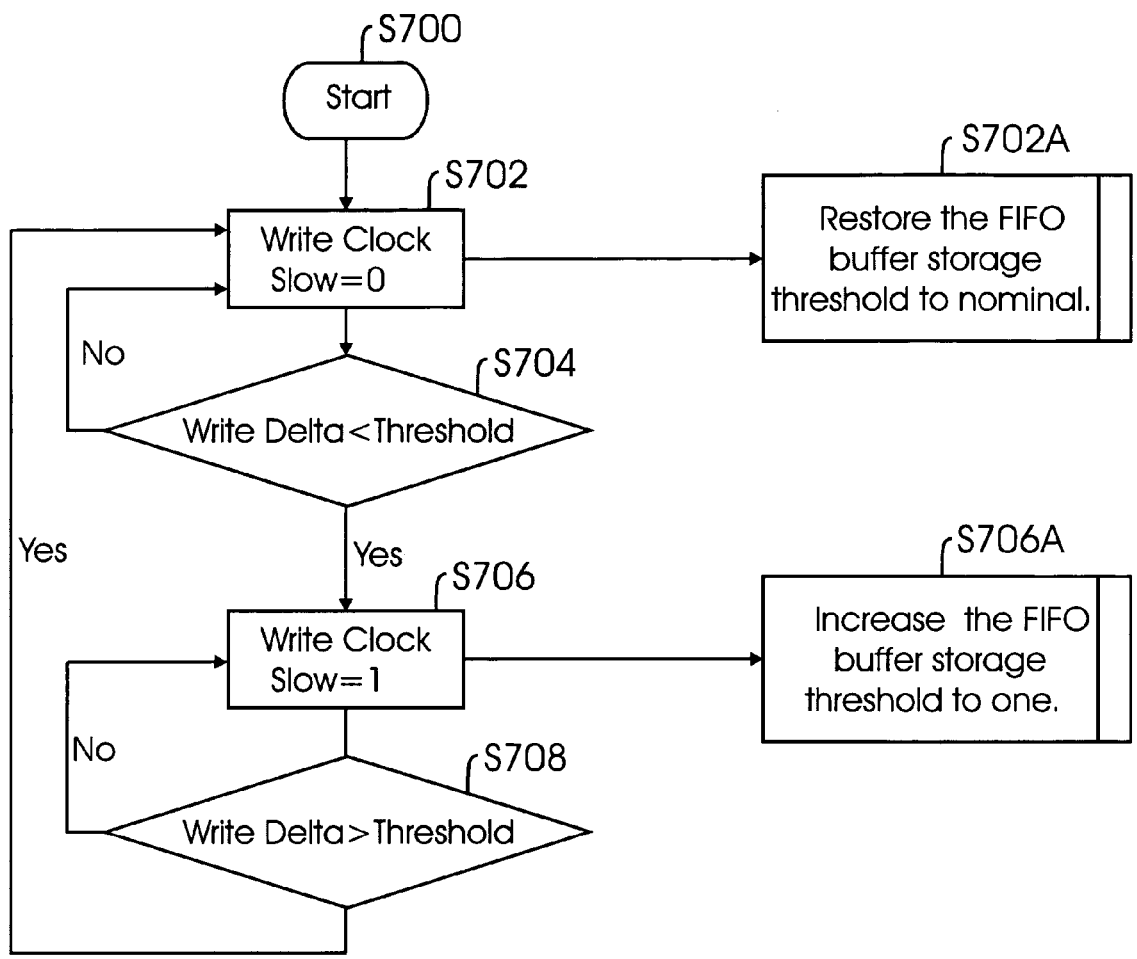

FIG. 7 shows a process flow diagram for dynamically adjusting the threshold value 409A. The process starts in step S700. Initially the Rate Monitoring Register 416 is cleared as indicated in step S702. In step S702, the write delta value (404A) is compared to the threshold value 409A, which is based on 409B. If delta value 404A is less than 409A, the process moves to step S704. If 404A is not less than 409A, then it indicates that the nominal threshold value (i.e. 409B) should be used (as shown in step S702A), since no SKIP symbol insertion is needed.

If step S704 indicates that a skip insertion is required (i.e. if 404A is less than 409B), then in step S706, the Rate Monitoring Register 416 is changed indicating that the receive clock rate 202B is slower than system clock rate 202E. In step S706A, the threshold value is changed to 409C so that 409A is based on 409C.

In step S708, delta 404A is compared to threshold value 409A, which is based on 409C. If delta 404A is greater than 409C, then the process moves to step S702. If delta 404A is less than threshold 409C, then the process reverts back to step S706, i.e., threshold value 409C is continually used for the comparison in step S708.

This process continues, until it is determined in step S708, that delta 404A is greater than threshold 409A (based on 409C). If delta 404A is greater than 409A, then the process reverts back to step S702, otherwise, the process stays in step S706, where threshold value 409C (sent as 409A) is compared with delta 404A.

In one aspect of the present invention, because the threshold value is changed dynamically, it allows elastic buffer 202B to process more SKIP additions which provides more margin for slower receive clocks. If a SKIP deletion is detected, the threshold value is changed dynamically to accommodate a faster receive clock.

Although the present invention has been described with reference to specific embodiments, these embodiments are illustrative only and not limiting. Many other applications and embodiments of the present invention will be apparent in light of this disclosure and the following claims.

What is claimed is:

1. An elastic buffer module for a PCI Express device, comprising:
    a memory buffer that receives data at a first clock speed and the data is read from the memory buffer at a second clock speed;
    a buffer control module that determines a difference between a write pointer value for writing the data in the memory buffer and a read pointer value for reading the data from the memory buffer and compares the difference to a threshold value and depending on the difference from the threshold value, a standard symbol is inserted or deleted from the data; wherein the buffer control module monitors the first clock speed and the second clock speed and on every clock cycle dynamically adjusts the threshold value based on a difference between the first clock speed and the second clock speed; and
    a data select module for selecting the dynamically adjusted threshold value and the dynamically adjusted threshold value is based on the difference between the first clock speed and the second clock speed.

2. The elastic buffer module of claim 1, wherein the standard symbol is a PCI Express SKIP symbol.

3. The elastic buffer module of claim 1, wherein a register bit value is used to monitor the difference between the first clock speed and the second clock speed.

4. The elastic buffer module of claim 1, wherein a monitoring register stores a value that indicates whether the first clock speed is slower or faster than the second clock speed.

5. The elastic buffer module of claim 1, wherein the PCI Express device is a host bus adapter.

6. A method for a PCI Express devices, comprising:
    determining a difference between a first clock speed at which data is written in a memory buffer of an elastic buffer module for the PCI Express device and a second clock speed at which the data is read from the memory buffer; wherein a monitoring register value indicates the difference between the first clock speed and the second clock speed;
    selecting a threshold value based on the monitoring register value; wherein the threshold value is dynamically adjusted for every clock cycle and the dynamicall adjusted threshold value depends on the difference between the first clock speed and the second clock speed;
    determining a difference between a write pointer value for writing the data in the memory buffer and a read pointer value for reading the data from the memory buffer;
    comparing the difference between the write pointer value and the read pointer value with the dynamically adjusted threshold value; and
    inserting or deleting a standard symbol based on the comparison of the difference between the write pointer value and the read pointer value with the dynamically adjusted threshold value.

7. The method of claim 6, wherein the standard symbol is a PCI Express SKIP symbol.

8. The method of claim 7, wherein a monitoring register holds a bit value that is used to monitor the difference between the first clock speed and the second clock speed.

9. The method of claim 8, wherein the PCI Express device is a host bus adapter that uses the elastic buffer module.

10. A host bus adapter ("HBA") operating as a PCI Express device, comprising:
    an elastic buffer module with a memory buffer that receives data at a first clock speed and the data is read from the memory buffer at a second clock speed;
    a buffer control module that determines a difference between a write pointer value for writing the data in the memory buffer and a read pointer value for reading the data from the memory buffer and compares the difference to a threshold value and depending on the difference from the threshold value, a standard symbol is inserted or deleted from the data; wherein the buffer control module monitors the first clock speed and the second clock speed and on every clock cycle dynamically adjusts the threshold value based on a difference between the first clock speed and the second clock speed; and
    a data select module for selecting the dynamically adjusted threshold value and the dynamically adjusted threshold value is based on the difference between the first clock speed and the second clock speed.

11. The HBA of claim 10, wherein the standard symbol is a PCI Express SKIP symbol.

12. The HBA of claim 10, wherein a register bit value is used to monitor the difference between the first clock speed and the second clock speed.

13. The HBA of claim 10, wherein a monitoring register stores a value that indicates whether the first clock speed is slower or faster than the second clock speed.

14. A network, comprising:
- a host bus adapter ("HBA") operating as a PCI Express device with an elastic buffer module comprising a memory buffer that receives data at a first clock speed and the data is read from the memory buffer at a second clock speed;
- a buffer control module that determines a difference between a write pointer value for writing the data in the memory buffer and a read pointer value for reading the data from the memory buffer and compares the difference to a threshold value and depending on the difference from the threshold value, a standard symbol is inserted or deleted from the data; wherein the buffer control module monitors the first clock speed and the second clock speed and on every clock cycle dynamically adjusts the threshold value based on a difference between the first clock speed and the second clock speed and a data select module for selecting the dynamically adjusted threshold value and the dynamically adjusted threshold value is based on the difference between the first clock speed and the second clock speed.

15. The network of claim 14, wherein the standard symbol is a PCI Express SKIP symbol.

16. The network of claim 14, wherein a register bit value is used to monitor the difference between the first clock speed and the second clock speed.

17. The network of claim 14, wherein a monitoring register stores a value that indicates whether the first clock speed is slower or faster than the second clock speed.

18. The network of claim 14, includes a storage area network interfacing with the host bus adapter.

* * * * *

UNITED STATES PATENT AND TRADEMARK OFFICE
CERTIFICATE OF CORRECTION

PATENT NO. : 7,281,077 B2
APPLICATION NO. : 11/099759
DATED : October 9, 2007
INVENTOR(S) : David E. Woodral It is certified that error appears in the above-identified patent and that said Letters Patent is hereby corrected as shown below:

In column 4, line 42, delete "(not shown" and insert -- (not shown) --, therefor.

In column 6, line 4, delete "deserialized," and insert -- deserialized. --, therefor.

In column 10, line 24, in claim 6, delete "dynamicall" and insert -- dynamically --, therefor.

In column 12, line 4, in claim 14, delete "speed" and insert -- speed; --, therefor.

Signed and Sealed this

Twenty-fifth Day of May, 2010

David J. Kappos
*Director of the United States Patent and Trademark Office*